April 14, 1964     A. B. WOOD     3,128,983

BEVERAGE CUP-HOLDER FOR MOTOR-VEHICLE DOORS

Filed March 4, 1963     4 Sheets-Sheet 1

INVENTOR:
ARTHUR B. WOOD
BY
*Pummler and Snow*
ATT'YS

April 14, 1964 A. B. WOOD 3,128,983
BEVERAGE CUP-HOLDER FOR MOTOR-VEHICLE DOORS
Filed March 4, 1963 4 Sheets-Sheet 2
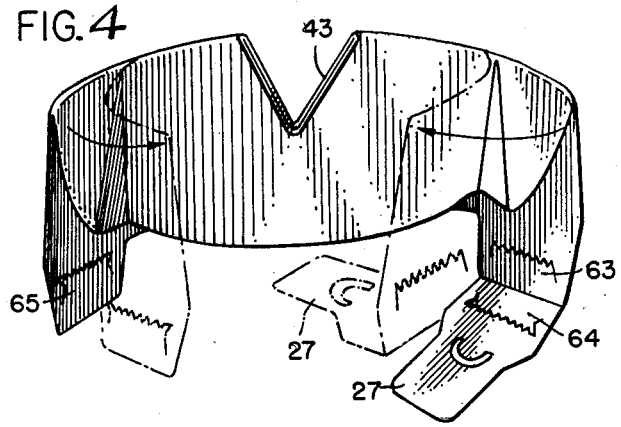
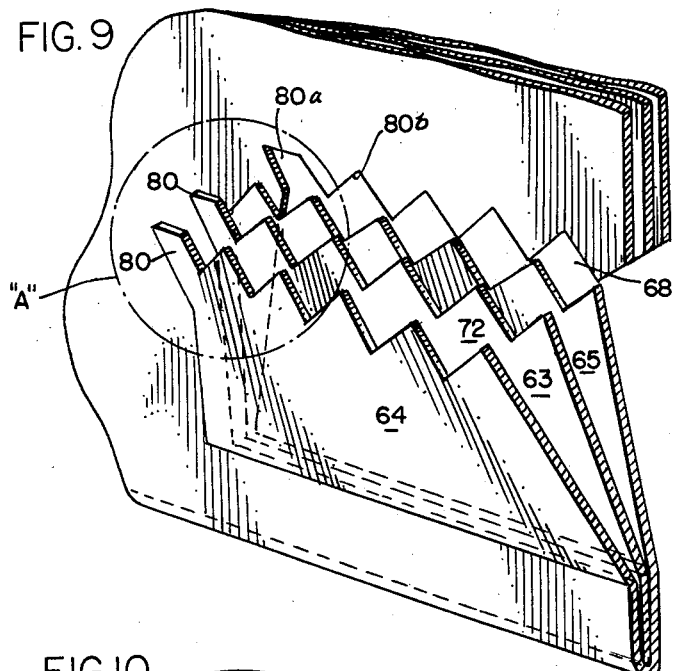
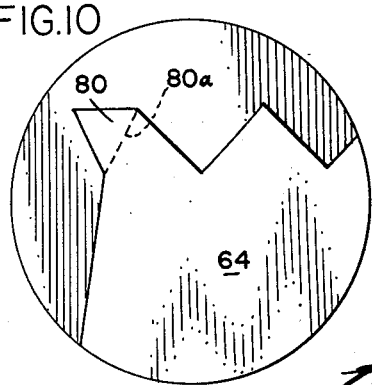
INVENTOR:
ARTHUR B. WOOD
BY
ATT'YS April 14, 1964   A. B. WOOD   3,128,983
BEVERAGE CUP-HOLDER FOR MOTOR-VEHICLE DOORS
Filed March 4, 1963   4 Sheets-Sheet 3
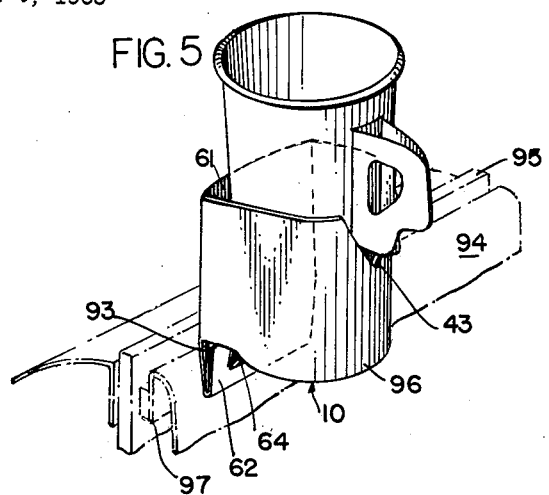
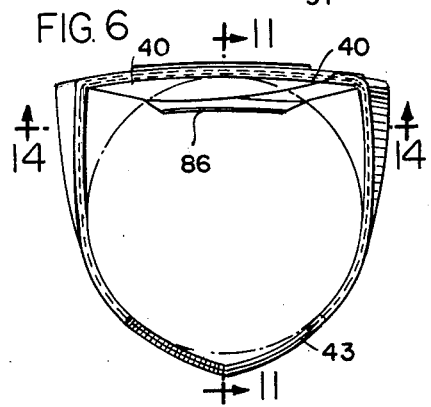
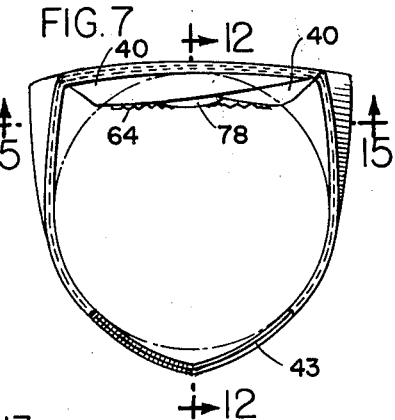
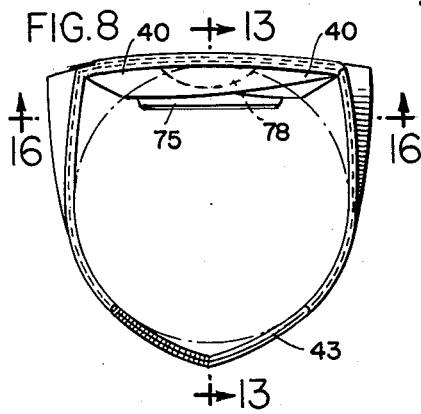
INVENTOR:
ARTHUR B. WOOD
BY
ATT'YS April 14, 1964 A. B. WOOD 3,128,983
BEVERAGE CUP-HOLDER FOR MOTOR-VEHICLE DOORS
Filed March 4, 1963 4 Sheets-Sheet 4

INVENTOR:
ARTHUR B. WOOD
BY
ATT'YS

United States Patent Office  3,128,983
Patented Apr. 14, 1964

3,128,983
BEVERAGE CUP-HOLDER FOR MOTOR-VEHICLE DOORS
Arthur B. Wood, Arlington Heights, Ill., assignor to Admart, Inc., Chicago, Ill., a corporation of Illinois
Filed Mar. 4, 1963, Ser. No. 262,515
17 Claims. (Cl. 248—208)

This invention relates to beverage cup-holders for positioning a cup of beverage on the door of a motor vehicle pending the consumption of the beverage by one sitting in the vehicle.

One of the problems experienced by persons who desire to consume refreshments, while sitting in a motor vehicle, is the handling of beverages, particularly when other food also is being consumed. This especially is true for persons who patronize drive-in refreshment stands or outdoor theaters. If food and beverage are ordered at these stands, where the patrons carry the containers from the dispensing counter to the vehicle, the problem at the vehicle is what to do with the cup or cups of beverage when other refreshments are being consumed. Some refreshment stands provide their patrons with one-time use trays. Other stands provide cup carriers. If one arrives back at the vehicle without over-turning a cup, the problem then is what to do with the cup of beverage when turning attention to the other food. Apart from the floor of the vehicle there hardly is a level place whereon to set a cup without fear of its being upset.

The main objects of this invention are to provide an improved form of beverage-cup holder for temporary positioning a cup of beverage on a vehicle door pending the consumption of the beverage by an occupant of the vehicle; to provide a cup-holder of this kind which quickly and easily may be shaped for use from a preformed flat templet-type piece of flexible material; to provide a cup-holder-forming templet of this kind wherein portions thereof are so shaped and relatively positioned as to permit the interfitting disposition thereof to secure the templet in cup-holding contour; to provide a cup-holder-forming templet of this kind having a post thereon for insertion into the space in a vehicle door at one side of the glass panel with the cup-embracing part of the holder resting on the door sill; to provide an improved vehicle-door cup-holder of this kind having yielding tongues engageable with an interior ledge on the door so as to retain the cup against accidental displacement; and to provide an improved cup-holder-forming templet of this kind of such simple character as to make its manufacture and marketing very inexpensive and the disposal thereof after one-time use economically reasonable.

In the adaptation shown in the accompanying drawings:

FIG. 4 is a perspective view of the folded-over templet flexed preparatory to completing the conversion into cup-holding form;

FIG. 5 is a perspective view of a cup holder, formed of the templet shown in FIG. 1, supporting a cup positioned on the door of a motor-vehicle;

FIG. 6 is a top plan view of a cup-holder formed of the templet shown in FIG. 2;

FIG. 7 is a top plan view of a cup holder formed from the templet shown in FIG. 1;

FIG. 8 is a top plan view of a cup holder formed of the templet shown in FIG. 3;

FIG. 9 is a much-enlarged, fragmentary, perspective view showing the relative arrangement of the serrated tongues which serve to lock the FIG. 1 templet in cup-holding contour;

FIG. 10 is a fragmentary view of the portion of FIG. 9 within the circle "A";

Figure 1:
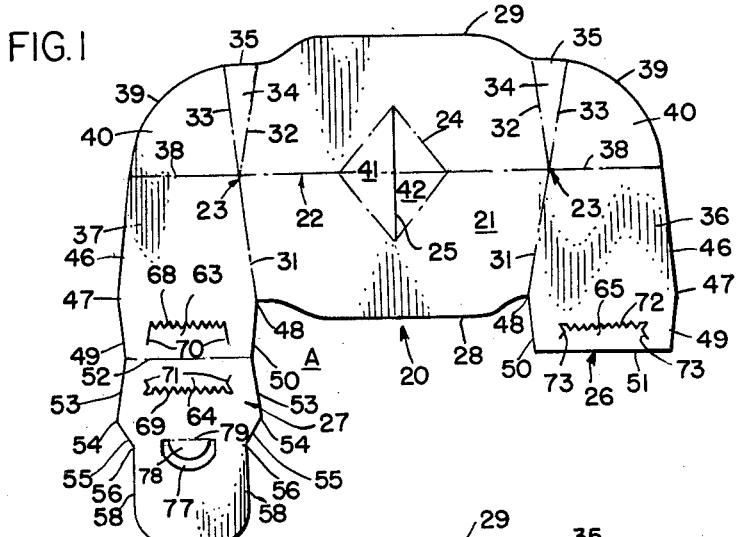
FIGURE 1 is a plan view of a preferred form of templet for conversion into a cup holder.

The essential concept of this invention involves a definitively-shaped, somewhat elongated, templet-type strip of flexible material variously scored and slitted and having interfitting formations to permit folding over the strip along a longitudinal score and then flexing the folded strip to bring the end portions into overlapping relationship to subtend the arcuate contour of the intermediate portion of the folded strip to form a cup-seating pocket with the formations interfitted to secure the end portions in their over-lapping relationship and provide a depending post insertable into the space in a motor-vehicle door between the sill and the glass panel.

A templet-type strip of flexible material 20 embodying the foregoing concept preferably is die-cut from calendered paper stock. The strip 20 is so contoured as to provide a main body part 21 of somewhat elongated contour with a longitudinal score 22, a pair of transverse Y-shaped scores 23 and a central diamond-shaped score 24 with a transverse slit 25. At opposite ends, on one lateral perimeter, are extensions 26 and 27 (26', 27') which, in the respective adaptations, are differently contoured, scored and slitted, as presently will be explained in detail.

Figure 2:
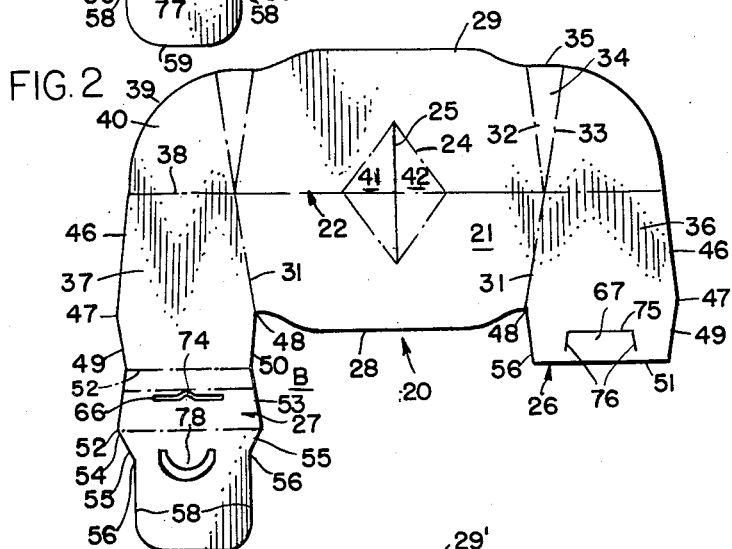
FIG. 2 is a plan view of a modified form of templet.
Figure 3:
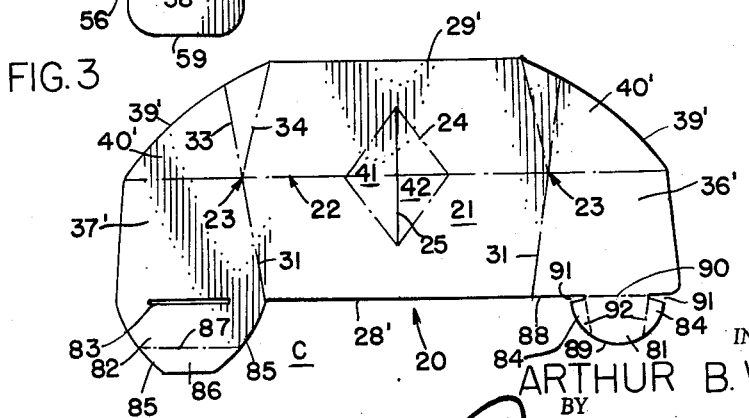
FIG. 3 is a plan view of another modified form of templet.
Figure 11:
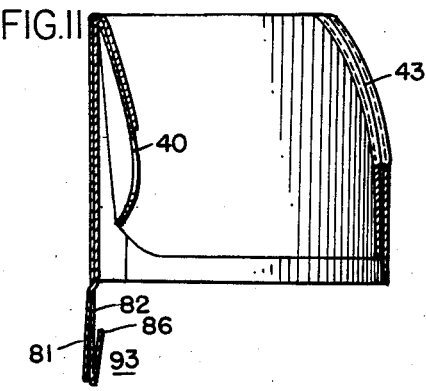
FIG. 11 is a vertical, sectional view taken on the plane of the line 11—11 of FIG. 6.

The contours of the several specimen templets A, B and C, shown in the respective FIGS. 1, 2 and 3, though not critical in the extreme sense of that word, are quite important in securing the most facile and acceptable conversion into use as a cup-holder for resting on the door of a motor-vehicle.

Specimen templets A and B have contours that are substantially identical. The lateral perimeter 28 of the main body part 21, between the extensions 26 and 27, and the comparable portions of the opposite lateral perimeter 29 are here shown as the same. Both contours are arched outwardly from the longitudinal score 22 between the Y-shaped transverse scores 23. These Y-shaped transverse scores 23 are so disposed relative to the perimeters 28 and 29 that the stem parts 31 of these scores 23 converge toward the perimeter 28 where it junctures with the extensions 26 and 27. The V-shaped parts 32 and 33 of the scores 23 converge and diverge respectively toward the perimeter 29 with the ends of the part 32 terminating substantially in transverse alignment with the ends of the stem parts 31. The ends of the diverging score parts 33 terminate a short distance away from the ends of the score parts 32. Thus, the respective V-shaped score parts 32 and 33 define triangular gussets 34 with a straight base 35 forming a continuation of the perimeter 29. The function of these gussets 34 will be explained presently.

Those portions of the strip 20, outwardly of the transverse scores 23, constitute the hereinafter referred-to end portions 36 and 37. Between the score parts 33 and the adjacent parts 38 of the longitudinal score 22, the perimeters of the end portions 36 and 37 are substantially quadrant shaped, as indicated at 39, subtending angles formed by the score parts 33 and 38, and forming quadrant-shaped gussets 40.

The end sections 36 and 37, on the side of the longitudinal score parts 38 opposite the quadrant gussets 40, have the perimeters 46, transverse to the longitudinal score 22, tapered slightly outward to points 47 aligned with the juncture 48 of the score parts 31 and the lateral perimeter 28 of the body part 21. These aligned points 47 and junctures 48 are regarded as defining the terminus of the respective end portions 36 and 37 as these portions thusly are referred to herein.

The shorter extension 26 and a comparable portion of the longer extension 27 have their opposite perimeters 49 and 50 beyond the points 47 converging toward the base 51 of the shorter extension 26 and a transverse score 52 in the longer extension 27, which score 52 is aligned with the base 51 of the extension 26.

Beyond the score 52, of the longer extension 27, the opposite perimeters 53 diverge to the points 54. The length of the perimeters 53 are substantially equal to that of the perimeters 49 and 50. At these points 54 the opposite perimeters 55 converge a short distance to the points 56. From the points 56 the perimeters 58 of the extension 27 extend further outwardly in parallel disposition and terminate with the rounded end 59.

The diamond-shaped scores 24 and the transverse slit 25 are so formed in the body part 21 as to bias the two-part opposed triangular sections 41 and 42 to buckle inwardly into superimposed relationship, when the strip 20 is doubled upon itself along the longitudinal score 22, and thereby form a V-shaped recess 43 in the resulting cup holder (see FIG. 5).

The specimen templets A and B are substantially identical in all of the above characteristics. The remaining differences have to do with the "formations" whereby, in the converted cup-holder, the end portions 36 and 37 are secured in their overlapping relationship to constitute a pocket 61 for seating a cup and a post 62 for inserting into the space between a vehicle-door sill and the glass panel shown in FIG. 5, as presently will be explained more fully.

In the specimen templet A these "formations" are the three serrated tongues 63, 64 and 65. In the specimen templet B these "formations" comprise a slot 66 and a tongue 67.

The tongues 63 and 64 are formed in the longer extension 27 by the transverse serrated slits 68 and 69 and the pairs of short end slits 70 and 71, respectively, oppositely disposed on opposite sides of and equidistant from the score 52. The tongue 65 is formed in the shorter extension 26 by a transverse serrated slit 72 and a pair of short-end slits 73 inwardly from the base 51 and in the same relationship to the base 57 as the serrated slit 68 and end slits 70 of the tongue 63 bear to the score 52 in the extension 27.

The three tongues 63, 64 and 65 thus are so disposed that when the strip 20 is doubled upon itself and flexed to position the end portions 36 and 37 and the extension 27 in overlapping relationship, for conversion to a cup holder, the three tongues 63, 64 and 65 are superimposed one on another. In such relationship these tongues are subject to being depressed inwardly from one face of these overlapping portions so as to retain them in that relationship as will be explained presently.

The serration slits 69 and 72, for the tongues 64 and 65, are so formed that the opposite end prongs 80 extend oppositely outwardly of the comparable opposite end prongs 80a of the serration slit 68 for the tongue 63. When the strip 20 is converted into cup-holder use these prongs 80 and 80a are disposed to ensure retention of the tongues 63, 64 and 65 in their off-set position with respect to the overlapping end portions 36 and 37, as subsequently will be explained more fully.

The "formation" slot 66, in extension 27 of specimen templet B, is an elongated cut-out located outwardly of the score 52 substantially the same distance as is the serrated slit 69 of the tongue 64 of the specimen templet A. Preferably, the slot 66 has a slight medial offset 74 to better grip the tongue 67 when inserted through the slot 66 for retaining the templet into a cup-holder conversion, as will be explained presently. The tongue 67 is formed by a straight transverse slit 75 and a pair of short end slits 76 and is disposed in substantially the same relationship to the base 51 of the extension 26 as the tongue 65 assumes in the extension 26 of the specimen templet A.

The slot 66 and the tongue 67 are so disposed relatively that when the strip 20 is doubled upon itself and flexed, to position the end portions 36 and 37 and the extension 27 in overlapping relationship, the tongue 67 extends out through the slot 66 so as to retain these portions in such overlapping relationship.

In each of the specimen templets A and B the extension 27 is formed with a semi-circular slot (or slit) 77 to provide an auxiliary semi-circular tongue 78 with a subtended score 79. In the converted cup holder this tongue 67 may be bent into a position transverse to the plane of the extension 27 to limit the seating of a cup in the pocket 61, as will be pointed out presently.

The specimen templet C, of FIG. 3, is similar in some respects and dissimilar in other respects to the specimen templets A and B. The body portion 21 has substantially the same longitudinal scoring 39' and the transverse scoring 23. However, the strip 20 is narrower and the lateral perimeters 28' and 29' are straight. The perimeters 39' of the quadrant gusset 40' are of a larger radius and the extensions 81 and 82 are much more abbreviated and differently shaped.

In this specimen templet C the "formation" for retaining the end portions 81 and 82 in overlapping relationship comprise a slot 83 and ears 84 on the extension 81. The extension 82 has its arcuate side perimeters 85 converging toward a straight transverse end with a score 87 intermediate the slot 83 and the extension end to form a flap 86. The slot 83 is located at the juncture of the end portion 37' and the extension 82 in alignment with the perimeter 28' and the base 88 of the end portion 36'.

The extension 81 has a nearly circular perimeter 89 and is integrated with the base 88 of the end portion 36' by a score 90, thus forming opposed inwardly-extending recesses 91. From the inner ends of the recesses 91 scores 92 converge away from the base 88 to form the ears 84. The slot 83 and the ears 84 are so disposed that when the strip 20 is doubled upon itself and flexed to position the end portions 36' and 37' in overlapping relationship the extension 81 may have the ears 84 bent inwardly to permit the extension 81 to be inserted through the slot 83. Upon passing through the slot 83 the ears 84 will flex back to a nearly coplanar position with the main part of the extension 81 so as to retain these end portions 36' and 37' in their overlapping relationship during the use of the cup holder.

The conversion of any of these three specimen templets A, B and C into cup-holding use is the same only in the first step of doubling over of the strip 20 preparatory to flexing it into cup-holding form. Such doubling over of the strip 20 generally will cause the triangular-shaped sections 41 of the scored and slit medial diamond 24 to double inwardly to form the V-shaped recess 43 (FIG. 5).

For specimen templet A the thumb and two adjacent fingers of one's hands should grasp the folded over edges of end portions 36 and 37 of the strip flexed, as shown in FIG. 4, to prepare to insert the folded-over end portion 36 into the folded-over end portion 37. This will dispose the tongues 63 and 65 in superimposed relationship. The extension 27 then is doubled back along the score 52 and flexed to insert the free end thereof upwardly over the base edge 51 of the extension 26 and tucked in under the overlapping gussets 40. This will bring the tongue 64 into superimposed registration with the tongues 63 and 65. Thereupon, these superimposed tongues 63, 64 and 65 may be pressured inwardly from the face of the folded-over extension 27 (FIG. 12) just above the edge along the score 52. Such inward depression of these superimposed tongues ensures the retention of the flexed strip in cup-holding use.

Such overlapping of the end portions 36 and 37 disposes them very slightly off from a planar form subtending the arcuate contour which the intermediate body portion 21 of the strip 20 is inevitably forced to assume. Thus, the strip 20 is converted into the cup-defining pocket 61.

When these superimposed tongues 63, 64 and 65 are thus depressed inwardly from the face of the extension 27 the end prongs 80—of the serrated slits 60 and 72—become disposed inwardly of that portion of the face of the extension that defines the recesses from which the end prongs 80a are struck out. (See FIGS. 9 and 10.) Thus, the superimposed prongs 80 will rest against the face of the extension, outwardly of the recesses defining the prongs 80a. Hence, these prongs 80 will ensure the tongues 63, 64 and 65 remaining in their inwardly-depressed positions and thereby ensure the retention of the end portions 26 and 27 in their overlapping relationship.

As a result of flexing the folded strip 20 into cup-holding contour, the V-shaped gussets 34 tend to force the arcuate perimeters of the overlapping gussets 40 inwardly toward the opposed arcuate contour of the intermediate portion of the strip (see FIGS. 6, 7 and 8). Hence, when a cup is seated in the pocket 61, the resiliency of the gussets 40 tend to conform to the contour of the cup and, thereby, yieldingly retain the cup in the pocket 61.

Figure 13:
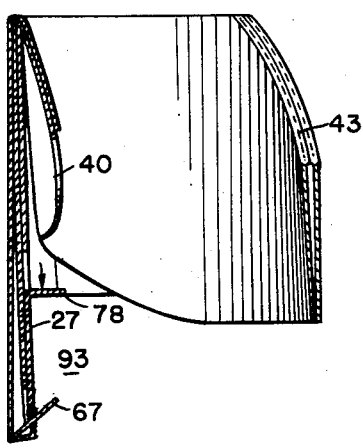
FIG. 13 is a vertical, sectional view taken on the plane of the line 13—13 of FIG. 8.
Figure 14:
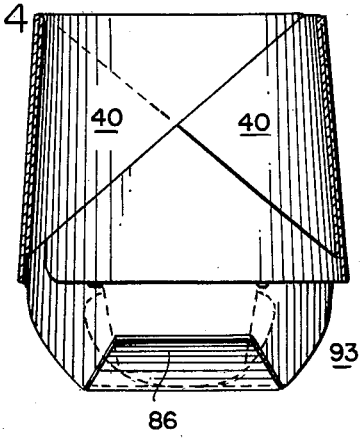
FIG. 14 is a vertical, sectional view taken on the plane of the line 14—14 of FIG. 6.
Figure 15:
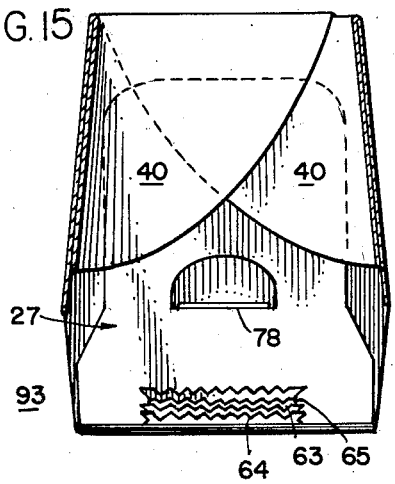
FIG. 15 is a vertical, sectional view taken on the plane of the line 15—15 of FIG. 7.
Figure 16:
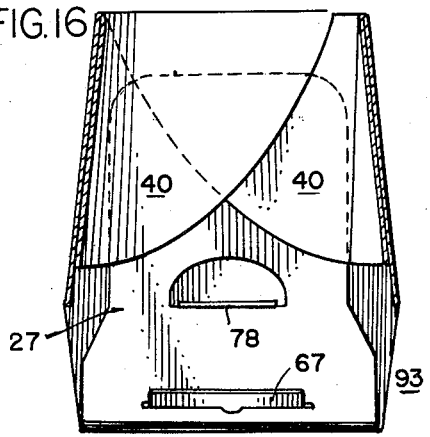
FIG. 16 is a vertical, sectional view taken on the plane of the line 16—16 of FIG. 8.

For the specimen templet B the conversion of the folded strip 20 into cup-holding form is substantially the same as the specimen templet A, except that the extension 27 is first doubled back along the score 50 to a position substantially normal to the overlapping end portions 36 and 37. In this position the tongue 67 is inserted into the slot 74. This permits the free end of the extension 27 then to be inserted up under the overlapping gussets 40 (FIG. 13). The tongue 67 being inserted through the slot 75 ensures the retention of the flexed strip 20 in cup-holding use.

Figure 12:
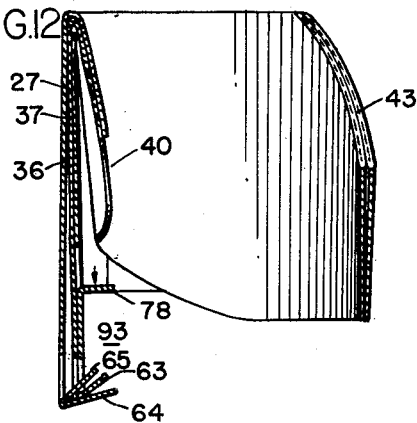
FIG. 12 is a vertical, sectional view taken on the plane of the line 12—12 of FIG. 7.

When such a cup-holder conversion of the folded strip 20 has been made for either of the specimen templets A and B, the auxiliary tongue 78 is bent inwardly downward along the score 79 to dispose the tongue transversely to the plane of the overlapping end portions 36 and 37. The tongue 78, in that position, becomes a stop or ledge to limit the pressing of a cup into a pocket 61 (FIGS. 12 and 13).

For the specimen templet C the conversion of the folded strip 20 into a cup holder is the same as for the other specimen templets A and B up to securing the end portions 36′ and 37′ in overlapping relationship. After the end portion 36′ is inserted into the end portion 37′ the ears 84 on the extension 81 are folded in and the extension 81 inserted through the slot 83 to bring the recesses 91 to set over the ends of the slot 83. This ensures the retention of the flexed strip 20 in cup-holding use.

As will be noted from FIGS. 11–16, the conversion of any one of the specimen templets A, B or C into cup-holding use results in portions of the extensions 26 and 27 (26′ and 27′) being disposed below the perimeter 28 (28′). This provides a post 93 whereby the cup-holder may be set on a vehicle door for the convenient support of a cup of beverage. Such positioning of the cup-holder is effected by pressing the post 93 down into the space between the sill 94 of the door frame and the glass panel 95.

For cup-holders converted from the specimen templets A and B the pressing of the post 93 down into this door space will cause the inwardly-extending tongues 63, 64 and 65 (Specimen A) or the tongue 67 (Specimen B, FIGS. 12 and 13) to be pressed back against the extension 27 as the post 93 is pressed down to bring the bottom edge 96 of the converted cup-holder to rest on the sill 94 (FIG. 5). When the cup-holder thus comes to rest on the sill 94 the above-mentioned tongues on either type of cup-holder will spring back into angled disposition to the respective posts 93, below a conventional ridge 97 on the inside of the vehicle door, to secure the cup-holder against accidental dislodgment from the door.

For a cup-holder converted from the specimen templet C the end flap 86 of the extension 82, below the score 87, has to be bent up against the exposed face of the extension 82 (FIGS. 11 and 14) before the post 93 is pressed down into the space between the sill 94 and the panel 95. Upon passing below the ridge 97 this flap 86 will spring back in transverse position to the post 93.

In actual use, quantities of one or another of these specimen templets A, B or C will be on hand, at a drive-in refreshment stand, in their flat form. A patron receiving a cup of or for a beverage will be handed one such templet. Either before leaving the stand or at the vehicle, the patron will convert the flat templet into cup-holding use as herein-before explained.

When any one of these three types of converted cup-holders is set on a vehicle door, as above explained, it is very stably positioned. A cup of beverage seated in the holder makes it convenient for an occupant of the vehicle to consume other refreshment interspersed, if desired, with drafts of beverage from the cup.

In the event a refreshment stand hands out cups with handles, the seating of the cup in any one of these types of cup-holders disposes the handle conveniently in the recess 43.

Upon the consumption of the beverage being completed the cup-holder is easily withdrawn from the vehicle door and consigned to a convenient trash receptacle.

Although several embodiments of this invention have been herein shown and described, it will be understood that details of the structures shown may be altered or omitted without departing from the spirit of the invention as defined by the following claims.

I claim:

1. A cup-holder-forming templet comprising, an elongated strip of flexible material having end extensions disposed transversely outward from one lateral perimeter of the strip, a score in the strip extending longitudinally thereof to facilitate the folding of the strip upon itself, transverse scores in the strip located inwardly from the ends thereof and converging oppositely outwardly from the longitudinal score toward the opposite lateral perimeters of the strip, a pair of scores each extending from the intersection of said transverse scores and said longitudinal score, and diverging outwardly to the upper perimeter of said strip the extensions having formations therein whereby when the folded strip of material is flexed to dispose the folded end portions, outwardly of the transverse scores, into overlapping relationship they are retained in such relationship by the interfitting extension formations so that the overlapping end portions subtend the resulting arcuate contour of the intermediate portion of the folded strip to provide a pocket for seating a cup.

2. A cup-holder-forming templet comprising, an elongated strip of flexible material having end extensions disposed transversely from one lateral perimeter of the strip, a score in the strip extending longitudinally thereof to facilitate the folding of the strip upon itself, transverse Y-shaped scores located inwardly from the ends of the strip of material with the stem parts of the Y-scores converging outwardly from the longitudinal score to the one lateral perimeter, and the V-shaped parts of the Y-scores converging and diverging respectively outwardly from the longitudinal score toward the other lateral perimeter of the strip, the extensions having formations therein whereby when the folded strip of material is flexed to dispose the folded end portions, outwardly of the respective converging scores, in overlapping relationship they are retained in such relationship by the interfitting extension formations so that the overlapping end portions subtend the resulting arcuate contour of the intermediate portion of the folded strip to provide a pocket for seating a cup, with the overlapping sections of the folded end portions, between the transverse diverging scores and the defining ends of the longitudinal score, bulging inwardly toward the arcuate portion to yieldingly contact a cup seated in the pocket.

3. A cup-holder-forming templet as set forth in claim 1 wherein the central section of the strip of material is transversely slit and diagonally scored on opposite sides of the longitudinal score whereby the folding over of the strip of material upon itself causes the parts of the strip between the transverse slit and the diagonal scores to fold inwardly between the folded parts of the strip to form a slot extending inwardly from the fold in the strip substantially medially of the arcuately-contoured intermediate portion of the folded strip to receive the handle on a cup seated in the pocket.

4. A cup-holder-forming templet as set forth in claim 2 wherein a diamond-shaped score is formed substantially centrally of the strip of material with a transverse slit in the strip across the diamond score whereby the folding over of the strip of material upon itself causes the parts of the strip within the diamond score at opposite sides of the slit to fold inwardly between the folded-over strip and thereby form a V-shaped slot substantially medially of the arcuately-contoured intermediate portion of the folded strip to receive a handle on a cup seated in the pocket.

5. A cup-holder-forming templet as set forth in claim 1 wherein the perimeters of the strip of material between the ends of the longitudinal score and the transverse scores extending out to the opposite perimeters are substantially of arcuate form.

6. A cup-holder-forming templet comprising, an elongated strip of flexible material having end extensions disposed transversely outward from one lateral perimeter of the strip, one of which extensions is longer than the other, a score in the strip extending longitudinally thereof to facilitate the folding of the strip upon itself, transverse scores in the strip located inwardly from the ends thereof and converging outwardly from the longitudinal score toward the opposite perimeters of the strip, the longer extension being transversely scored in alignment with the end of the shorter extension, a pair of scores each extending from the intersection of said transverse scores and said longitudinal score, and diverging outwardly to the upper perimeter of said strip, a slot formed in one extension and a tongue struck out from the other extension and relatively positioned for inserting the tongue into the slot whereby the folded strip may be flexed to dispose the folded end portions, outwardly of the transverse scores, and the end of the longer extension in overlapping relationship and subtending the resulting arcuate contour of the intermediate portion of the folded strip to provide a pocket for seating a cup with the tongue inserted in the slot to secure the flexed strip in pocket-forming contour.

7. A cup-holder forming templet as set forth in claim 6 wherein the tongue is scored to define lateral ears flexible inwardly to permit insertion of the tongue into the slot with the ears thereupon resuming a nearly-coplanar position with the tongue to retain the tongue in the slot.

8. A cup-holder-forming templet as set forth in claim 6 wherein a diamond-shaped score is formed substantially centrally of the strip of material with a transverse slit in the strip across the diamond score whereby the folding over of the strip of material upon itself causes the parts of the strip at opposite sides of the slit to fold inwardly between the folded-over strip and thereby form a V-shaped slot substantially medially of the arcuately-contoured intermediate portion of the folded strip to receive a handle on a cup seated in the pocket.

9. A cup-holder-forming templet comprising, an elongated strip of flexible material having end extensions disposed transversely outward from one lateral perimeter of the strip, one of which extensions is longer than the other, a score in the strip extending longitudinally thereof to facilitate the folding of the strip upon itself, transverse scores in the strip located inwardly from the ends thereof and converging outwardly from the longitudinal score toward the opposite perimeters of the strip, the longer extension being transversely scored in alignment with the end of the shorter extension, a pair of scores each extending from the intersection of said transverse scores and said longitudinal score, and diverging outwardly to the upper perimeter of said strip, transverse serrated slits formed in the longer extension on opposite sides of and equi-distance from the transverse score therein and with short slits extending from the end of each serrated slit inwardly toward the transverse score to form a pair of substantially matching depressible tongues, a matching depressible tongue formed in the shorter extension, whereby the folded strip may be flexed to dispose the folded end portions, outwardly of the transverse scores, and the end of the longer extension outwardly of its transverse score in overlapping relationship and subtending the resulting arcuate contour of the intermediate portion of the folded strip to provide a pocket for seating a cup, and disposing the extension serrated tongues in superimposed relationship to permit their depression inwardly of one face of the superimposed end portions to secure the flexed strip in pocket-forming relationship.

10. A cup-holder-forming templet as set forth in claim 9 wherein a diamond-shaped score is formed substantially centrally of the strip of material with a transverse slit in the strip across the diamond score whereby the folding over of the strip of material upon itself causes the parts of the strip within the diamond score at opposite sides of the slit to fold inwardly between the folded-over strip and thereby form a V-shaped slot substantially medially of the arcuately-formed intermediate portion of the folded strip to receive a handle on a cup seated in the pocket.

11. A cup-holder-forming templet as set forth in claim 6 wherein an auxiliary tongue is struck out from the longer extension outwardly from the slot therein and scored to permit disposition of the auxiliary tongue transversely of the plane of the overlapping end portion to serve as a ledge adjacent the base of the pocket to limit the insertion of a cup into the pocket.

12. A cup-holder-forming templet as set forth in claim 9 wherein an auxiliary tongue is struck out from the longer extension outwardly from the slits therein and scored to permit disposition of the tongue transversely of the plane of the overlapping end portions to serve as a ledge adjacent the base of the pocket to limit the insertion of a cup into the pocket.

13. A cup-holder-forming templet as set forth in claim 9 wherein the end prongs on the tongue formed by one of the serrated slits extend outwardly beyond the comparable end prongs on the tongue formed by another of the serrated slits to retain the overlapping tongues in their superimposed depression outwardly from one face of the superimposed end portions and ensure the retention of the flexed strip in its pocket-forming relationship.

14. A cup-holder-forming templet comprising, an elongated strip of flexible material having end extensions disposed transversely outward from one lateral perimeter of the strip, one of which extensions is longer than the other, a score in the strip extending longitudinally thereof to facilitate the folding of the strip upon itself, transverse Y-shaped scores located inwardly from the ends of the strip of material with the stem parts of the Y-scores converging outwardly from the longitudinal score to the one lateral perimeter and the V-shaped parts of the Y-scores converging and diverging respectively outwardly from the longitudinal score toward the other lateral perimeter of the strip, the longer extension being transversely scored in alignment with the end of the shorter extension, transverse serrated slits formed in the longer extension on opposite sides of and equi-distant from the transverse score therein and with short slits extending from the ends of each serrated slit inwardly toward the transverse score to form a pair of substantially matching depressible tongues, a matching depressible tongue formed in the shorter extension, whereby the folded strip may be flexed to dispose the folded end portions, outwardly of the transverse scores, and the end of the longer extension outwardly of the transverse score in overlapping relationship and subtending the resulting arcuate contour of the intermediate portion of the folded strip, to provide a pocket for the seating of a cup and disposing the serrated tongues in superimposed relationship to permit their depression inwardly of one face of the superimposed end portions to secure the flexed folded strip in cup forming relationship, and with the overlapping sections of the end portions, between the transverse diverging scores and the defining ends of the longitudinal scores, bulging inwardly toward the arcuate portion to yieldingly contact a cup seated in the pocket.

15. A cup-holder-forming templet as set forth in claim 14 wherein the end prongs on the tongue formed by one of the serrated slits extend outwardly of the comparable end prongs on the tongue formed by another of the serrated slits to retain the overlapping tongues in their superimposed depression inward from the one face of the superimposed end portions of the folded strip to ensure the retention of the superimposed relationship of end portions and the end of the longer extension.

16. A cup-holder-forming templet as set forth in claim 14 wherein an auxiliary tongue is struck out from the longer extension inwardly of the end thereof and scored to permit disposition of the auxiliary tongue transversely to the plane of the overlapping end portions to serve as a ledge adjacent the base of the pocket to limit the insertion of a cup in the pocket.

17. A cup-holder-forming templet as set forth in claim 14 wherein the end prongs on the tongue formed by one of the serrated slits extends outwardly beyond the comparable end prongs on the tongue formed by another of the serrated slits to retain the overlapping tongues in their superimposed depression inwardly from one face of the superimposed end portions and ensure the retention of the flexed strip in its pocket-forming relationship, and an auxiliary tongue is struck out from the longer extension inwardly from the end thereof and scored to permit disposition of the auxiliary tongue transversely of the plane of the overlapping end portions to serve as a ledge adjacent the base of the pocket to limit the insertion of a cup in the pocket.

References Cited in the file of this patent
UNITED STATES PATENTS

| | | |
|---|---|---|
| 690,486 | Webb | Jan. 7, 1902 |
| 1,546,983 | House | July 21, 1925 |
| 1,938,919 | Marsh | Dec. 12, 1933 |
| 2,797,815 | Gorman | July 2, 1957 |
| 2,831,647 | MacKay | Apr. 22, 1958 |